United States Patent
Kaltenbach et al.

(10) Patent No.: US 11,338,663 B2
(45) Date of Patent: May 24, 2022

(54) TRANSMISSION AND DRIVE SYSTEM OF A MOTOR VEHICLE

(71) Applicant: ZF Friedrichshafen AG, Friedrichshafen (DE)

(72) Inventors: Johannes Kaltenbach, Friedrichshafen (DE); Matthias Horn, Tettnang (DE); Uwe Griesmeier, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/286,373

(22) PCT Filed: Sep. 17, 2019

(86) PCT No.: PCT/EP2019/074793
§ 371 (c)(1),
(2) Date: Apr. 16, 2021

(87) PCT Pub. No.: WO2020/078639
PCT Pub. Date: Apr. 23, 2020

(65) Prior Publication Data
US 2021/0347244 A1    Nov. 11, 2021

(30) Foreign Application Priority Data
Oct. 18, 2018   (DE) ...................... 10 2018 217 829.1

(51) Int. Cl.
*B60K 6/547*     (2007.10)
*B60K 6/365*     (2007.10)
(Continued)

(52) U.S. Cl.
CPC .............. *B60K 6/547* (2013.01); *B60K 6/365* (2013.01); *B60K 6/48* (2013.01); *F16H 3/091* (2013.01); *B60K 2006/4825* (2013.01)

(58) Field of Classification Search
None
See application file for complete search history.

(56) References Cited

U.S. PATENT DOCUMENTS 9,254,737 B2 *   2/2016   Kaltenbach ............ B60K 6/365
9,573,456 B2 *   2/2017   Lee ........................ F16H 3/006
(Continued)

FOREIGN PATENT DOCUMENTS

DE    102011089712 A1     6/2013
DE    102013215114 A1 *   2/2015 ............ B60W 10/08
(Continued)

OTHER PUBLICATIONS

International Search Report (English Translation) PCT/EP2019/074793, dated Dec. 9, 2019, (2 pages).

*Primary Examiner* — Dirk Wright
(74) *Attorney, Agent, or Firm* — Dority & Manning, P.A.

(57) ABSTRACT

A transmission (2) of a motor vehicle includes a first input shaft (7) for a first prime mover (3), a second input shaft (8) for a second prime mover (4), and an output shaft (9). A first sub-transmission (5) includes the first input shaft (7) and a countershaft (11) coupled to the first input shaft (7) via a constant ratio. Gearwheels (16, 17, 18) are arranged on the countershaft (11), which mesh exclusively into gearwheels (12, 13, 15) arranged coaxially to the first input shaft (7). At least some of these gearwheels (14, 15) mesh into gearwheels (20, 21) arranged on the output shaft (9). Shift elements (A, B, C, D) are associated with the first input shaft (7) as well as with the countershaft (11), which provide either a gear with a first number of instances of gearwheel meshing or a winding-path gear with a second number of instances of gearwheel meshing. A second sub-transmission (6) includes the second input shaft (8) and is designed as a planetary transmission. A ring gear (22) forms the second input shaft (8) of the second sub-transmission (6). A carrier (Continued)

(23) is permanently coupled to the output shaft (9) and to a gearwheel (18) arranged on the countershaft (11). Shift elements (F, E) are associated with the planetary transmission, via which, a sun gear (24) is fixedly connectable to the housing or the planetary transmission is bringable into direct drive.

12 Claims, 8 Drawing Sheets

(51) Int. Cl.
   *B60K 6/48* (2007.10)
   *F16H 3/091* (2006.01)

(56) References Cited

U.S. PATENT DOCUMENTS

| | | | |
|---|---|---|---|
| 9,593,768 B2 * | 3/2017 | Lee | B60K 6/547 |
| 9,764,630 B2 * | 9/2017 | Kaltenbach | B60K 6/48 |
| 2016/0176280 A1 | 6/2016 | Kaltenbach et al. | |
| 2017/0129323 A1 | 5/2017 | Fremau et al. | |

FOREIGN PATENT DOCUMENTS

| | | | | |
|---|---|---|---|---|
| DE | 102013223462 A1 * | 5/2015 | | F16H 3/725 |
| DE | 102016200583 A1 * | 7/2017 | | B60K 6/547 |
| WO | WO 2015014555 A1 | 2/2015 | | |
| WO | WO-2018028747 A1 * | 2/2018 | | F16H 3/093 |
| WO | WO-2018077454 A1 * | 5/2018 | | F16H 3/725 |
| WO | WO-2019001937 A1 * | 1/2019 | | B60K 6/36 |

* cited by examiner

Fig. 1

Shift Conditions with Exemplary Ratio Values

| Condition | Gear ICE | i_ICE | phi ICE | Gear EM1 | i_EM1 | A | B | C | D | E | F | Note |
|---|---|---|---|---|---|---|---|---|---|---|---|---|
| 1 | 1 | 8.60 | 1.58 | 1 | 8.63 | x |   |   |   | x |   | Hybrid Mode |
| 2 | 2 | 5.46 | 1.49 | 1 | 8.63 |   | x |   |   | x |   | Hybrid Mode |
| 3 | 3 | 3.68 | 1.40 | 1 | 8.63 |   |   | x |   | x |   | Hybrid Mode |
| 4 | 4 | 2.63 |   | 1 | 8.63 |   |   |   | x |   |   | Hybrid Mode |
| 5 | 1 | 8.60 |   | 2 | 5.46 | x |   |   |   |   | x | Hybrid Mode |
| 6 | 2 | 5.46 |   | 2 | 5.46 |   | x |   |   |   | x | Hybrid Mode |
| 7 | 3 | 3.68 |   | 2 | 5.46 |   |   | x |   |   | x | Hybrid Mode |
| 8 | 4 | 2.63 |   | 2 | 5.46 |   |   |   | x |   | x | Hybrid Mode |
| 9 | 0 |   |   | 1 | 8.63 |   |   |   |   | x |   | Purely Electric |
| 10 | 0 |   |   | 2 | 5.46 |   |   |   |   |   | x | Purely Electric |
| 11 | 1 | 8.60 |   | 0 |   | x |   |   |   |   |   | Purely Internal Combustion Engine-driven |
| 12 | 2 | 5.46 |   | 0 |   |   | x |   |   |   |   | Purely Internal Combustion Engine-driven |
| 13 | 3 | 3.68 |   | 0 |   |   |   | x |   |   |   | Purely Internal Combustion Engine-driven |
| 14 | 4 | 2.63 |   | 0 |   |   |   |   | x |   |   | Purely Internal Combustion Engine-driven |

Gear 0 Means Neutral

Exemplary Ratio Values

| Gear Stage | i | Effective Direction |
|---|---|---|
| i_ab | 3.50 | Output Shaft to Differential |
| i0 | -1.72 | Stationary Transmission Ratio Planetary Gear Set |
| i1 | 1.50 | Countershaft to Ring Gear |
| i2 | 1.56 | Input Shaft to Output Shaft |
| i3 | 1.33 | Countershaft to Input Shaft |
| i4 | 0.75 | Input Shaft to Output Shaft |
| ic | 1.05 | Input Shaft to Countershaft |

TRANSMISSION AND DRIVE SYSTEM OF A MOTOR VEHICLE

CROSS-REFERENCE TO RELATED APPLICATIONS

The present application is related and has right of priority to German Patent Application No. 102018217829.1 filed in the German Patent Office on Oct. 18, 2018 and is a nationalization of PCT/EP2019/074793 filed in the European Patent Office on Sep. 17, 2019, both of which are incorporated by reference in their entirety for all purposes.

FIELD OF THE INVENTION

The invention relates generally to a transmission of a motor vehicle. In addition, the invention relates generally to a transmission system of a motor vehicle.

BACKGROUND

US 2017/0129323 A1 describes a transmission of a motor vehicle designed as a hybrid vehicle. The transmission includes a first input shaft, to which a first prime mover is coupleable, and a second input shaft, to which a second prime mover is coupleable. Moreover, the transmission includes an output shaft, to which a drive output is coupleable. The first input shaft is an integral part of a first sub-transmission for the first prime mover. The second input shaft is an integral part of a second sub-transmission for the second prime mover. Both sub-transmissions are designed as a spur gear drive according to US 2017/0129323 A1. The two sub-transmissions are coupleable to one another and, in fact, via a shift element arranged on a countershaft.

The transmission according to US 2017/0129323 A1 needs a relatively large installation space and has a relatively high weight.

BRIEF SUMMARY OF THE INVENTION

On the basis thereof, example aspects of the invention provide a new type of transmission of a motor vehicle and a transmission system with a transmission of this type.

The transmission includes a first input shaft for a first prime mover.

In addition, the transmission includes a second input shaft for a second prime mover.

Moreover, the transmission includes an output shaft.

The transmission includes a first sub-transmission for the first prime mover, including the first input shaft and a countershaft coupled to the first input shaft via a constant ratio, wherein gearwheels are arranged on the countershaft, which mesh exclusively into gearwheels arranged coaxially to the first input shaft, wherein at least some of the gearwheels arranged coaxially to the first input shaft mesh into gearwheels arranged on the output shaft, wherein shift elements are associated with the first input shaft as well as with the countershaft, which, depending on their shift position, provide either a gear with a first number of instances of gearwheel meshing or a winding-path gear with a second, larger number of instances of gearwheel meshing for the first prime mover.

The transmission includes a second sub-transmission for the second prime mover, which includes the second input shaft, wherein the second sub-transmission is designed as a planetary transmission with a sun gear, a ring gear, and a carrier, wherein the ring gear forms the second input shaft of the second sub-transmission, wherein the carrier is permanently coupled to the output shaft and to a gearwheel arranged on the countershaft, and wherein shift elements are associated with the planetary transmission, via which, depending on their shift position, the sun gear is fixedly connectable to the housing or the planetary transmission is bringable into direct drive.

The first sub-transmission for the first prime mover, which is preferably designed as an internal combustion engine, is designed as a spur gear drive with intermeshing gearwheels. Gearwheels arranged on the countershaft mesh exclusively into gearwheels that are arranged coaxially to the first input shaft of the first sub-transmission. As a result, the countershaft can be freely positioned in space in relation to the first input shaft. Depending on the shift position of the shift elements associated with the first sub-transmission, namely the countershaft and the first input shaft, the first sub-transmission provides either a conventional gear with a first number, in particular with two, instances of gearwheel meshing or a winding-path gear with a second number, namely with four, instances of gearwheel meshing.

The second sub-transmission for the second prime mover, which is preferably designed as an electric machine, is designed as a planetary transmission. The ring gear provides the second input shaft of the second sub-transmission. The carrier is coupled via a gearwheel to the output shaft common to both sub-transmissions. Moreover, the carrier is permanently coupled to a gearwheel of the countershaft via a further gearwheel. Depending on the shift position of shift elements associated with the second sub-transmission and, thereby, with the planetary transmission, the sun gear can either be fixedly connected to a housing or, to provide direct drive, connected to another element of the planetary transmission.

A particularly compact design can be implemented for the transmission according to example aspects of the invention. This is due to, among other things, the fact that the second sub-transmission is designed as a planetary transmission and the countershaft can be freely positioned in space in relation to the first input shaft and does not mesh with the output shaft. The countershaft and the output shaft can be designed to be relatively short due to the design of the second sub-transmission as a planetary transmission. A further installation space-related advantage can be achieved for the case in which the shift elements associated with the second sub-transmission, depending on which the sun gear is either fixedly connected to the housing or to another element of the planetary transmission, are designed as a double shift element and are situated at the end of the transmission, namely at an opposite end relative to the connection of the first prime mover.

According to one advantageous example refinement, the carrier of the planetary transmission is permanently coupled to the output shaft via a gearwheel arranged coaxially to the first input shaft, wherein the carrier of the planetary transmission is permanently coupled to a gearwheel arranged on the countershaft via a further gearwheel arranged coaxially to the first input shaft. The gearwheel arranged coaxially to the first input shaft, which permanently couples the carrier of the planetary transmission to the output shaft, and the gearwheel arranged coaxially to the first input shaft, which permanently couples the carrier of the planetary transmission to a gearwheel arranged on the countershaft, are preferably designed as idler gears of the first input shaft, which are connected to each other in a rotationally fixed manner.

This example embodiment is preferred in order to permanently couple the carrier, on the one hand, to the output shaft and, on the other hand, permanently couple the carrier to a gearwheel of the countershaft in the case of minimal installation space. In the case of minimal installation space, all desired gear stages can be made available.

According to one advantageous example refinement, a further shift element is associated with the planetary transmission, via which, depending on the shift position, a speed superimposition mode is settable for the first prime mover and the second prime mover at the planetary transmission, in which the first prime mover is coupled to the sun gear of the planetary transmission, the second prime mover is coupled to the ring gear of the planetary transmission, and the carrier of the planetary transmission is coupled to the output shaft. By means of this further shift element associated with the planetary transmission, a electrodynamic starting operation (EDA) operating mode can be made available. In particular, a starting operation is possible in the EDA operating mode even when the electrical energy accumulator is dead.

According to one advantageous example refinement, a third prime mover is present, which is designed as an electric machine, wherein the third prime mover is operatively connected to the first input shaft. For the case in which a further, third prime mover is present, which is preferably designed as an electric machine, as is the case with the second prime mover, further advantages can be achieved. Thus, in particular, the third prime mover designed as an electric machine can operate as a starter-generator and improve the function of the transmission and/or of the transmission system including the transmission. For the case in which a separating clutch is additionally present between the first prime mover, which is designed as an internal combustion engine, and the first input shaft, purely electric powershifts can be made available when the separating clutch is disengaged. As a result, the operation of a transmission system including the transmission can be further improved.

BRIEF DESCRIPTION OF THE DRAWINGS

Exemplary embodiments of the invention are explained in greater detail with reference to the drawings, without being limited thereto, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
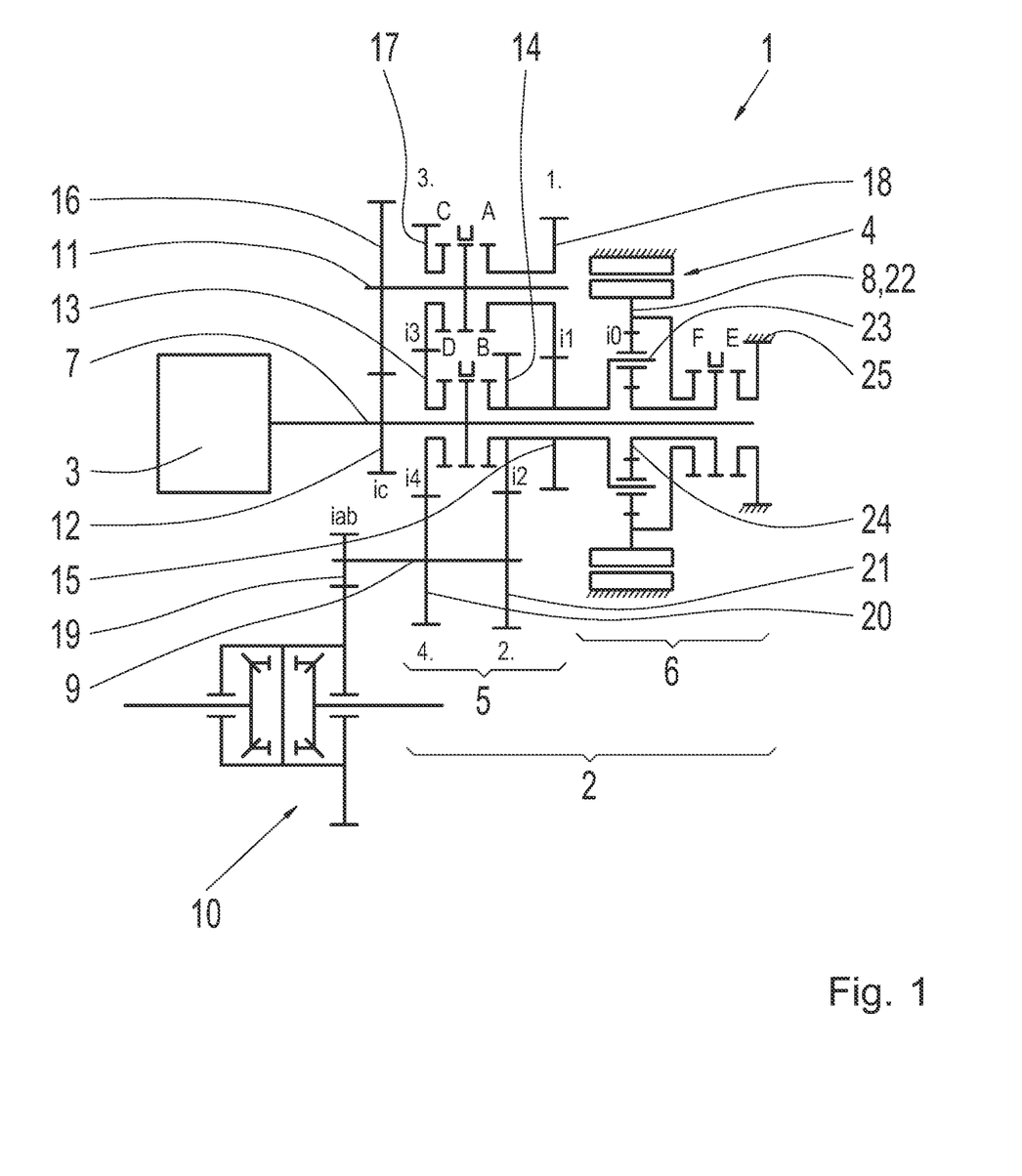
FIG. 1 shows a diagram of a transmission system of a motor vehicle with a first exemplary embodiment of a transmission.

FIG. 1 shows a diagram of a transmission system 1 of a motor vehicle according to example aspects of the invention, which includes a transmission 2 according to example aspects of the invention.

The transmission system 1 includes, in addition to the transmission 2, a first prime mover 3 and a second prime mover 4, wherein the first prime mover 3 is preferably designed as an internal combustion engine and the second prime mover 4 is preferably designed as an electric machine. Thus, the transmission system from FIG. 1 is a hybrid transmission system.

The transmission 2 includes two sub-transmissions 5, 6. The first sub-transmission 5 acts as a sub-transmission for the first prime mover 3, which is preferably designed as an internal combustion engine. The first prime mover 3 is coupleable to a first input shaft 7 of the first sub-transmission 5 of the transmission 2.

The second sub-transmission 6 acts as a sub-transmission for the second prime mover 4, which is designed as an electric machine. The second prime mover 4, which is preferably designed as an electric machine, is coupleable to a second input shaft 8 of the transmission 2, which is made available by the second sub-transmission 6.

In addition, the transmission 2 includes an output shaft 9, which is common to both sub-transmissions 5, 6 and to which a drive output 10 is coupled. As part of the drive output 10, a differential is shown in FIG. 1.

The first sub-transmission 5 includes, in addition to the first input shaft 7, a countershaft 11, to which the first prime mover 3, preferably designed as an internal combustion engine, is permanently coupled in the exemplary embodiment shown from FIG. 1. The countershaft 11 extends in parallel to the first input shaft 7, is coupled to the first input shaft 7 via a constant ratio ic, and includes gearwheels 16, 17, 18, which mesh exclusively with gearwheels 12, 13, and 15 arranged coaxially to the first input shaft 7. Thus, the countershaft 11 has no gearwheel meshing with the output shaft 9 and/or the differential 10, as the result of which the countershaft 11 can be advantageously located in relation to the first input shaft 7, and, in fact, can be arranged nearly arbitrarily freely in space, provided a geometric collision with other assemblies does not arise.

The gearwheels positioned coaxially to the first input shaft 7 are the gearwheels 12, 13, 14, and 15. The gearwheel 12 is a fixed gear, which is coupled to the first input shaft 7 in a rotationally fixed manner. The gearwheels 13, 14, and 15, however, are idler gears. The two idler gears 14 and 15 are coupled to each other in a rotationally fixed manner.

Two shift elements B and D are associated with the first input shaft 7. These two shift elements B and D are preferably formed by a double shift element, wherein only one of these shift elements B and D can ever be engaged at a time.

For the case in which the shift element D is engaged, the idler gear 13 is coupled to the first input shaft 7 in a rotationally fixed manner. However, for the case in which the shift element B is engaged, the two gearwheels 14 and 15 coupled to each other in a rotationally fixed manner are coupled to the first input shaft 7 in a rotationally fixed manner.

As mentioned above, the countershaft 11 is engaged with the first input shaft 7 via the constant ratio ic. Thus, the fixed gear 16, which meshes with the fixed gear 12 of the first input shaft 7, is associated with the countershaft 11.

In addition, the countershaft 11 supports the idler gears 17 and 18, wherein the idler gear 17 of the countershaft 11 meshes with the idler gear 13 of the first input shaft 7, whereas the idler gear 18 of the countershaft 11 meshes with the idler gear 15 of the first input shaft 7.

The two shift elements A and C are associated with the countershaft 11 and are preferably made available by a double shift element, and so only one of these shift elements A and C can ever be engaged at a time.

For the case in which the shift element C is engaged, the idler gear 17 of the countershaft 11 is rotationally fixed to the countershaft 11. However, for the case in which the shift element A is engaged, the idler gear 18 of the countershaft 11 is rotationally fixed to the countershaft 11.

The gearwheels 16, 17, and 18 of the countershaft 11 mesh, as mentioned above, exclusively into gearwheels positioned coaxially to the first input shaft 7, namely into the gearwheels 12, 13, and 15. The gearwheels 16, 17, and 18 of the countershaft 11 do not mesh into gearwheels of the output shaft. The gearwheels of the output shaft 9 are the gearwheels 19, 20, and 21, which are all designed as fixed gears of the output shaft 9. Thus, the gearwheel 19 meshes into the differential of the drive output 10. The gearwheel 20 meshes into the idler gear 13 of the first input shaft 7, and the gearwheel 21 meshes into the idler gear 14 of the first input shaft 7.

Accordingly, the first sub-transmission 5 for the first prime mover 3, which is preferably designed as an internal combustion engine, is designed as a spur gear drive made up of intermeshing gearwheels. Depending on the shift position of the shift elements A, B, C, and D associated with the first sub-transmission 5, either conventional gears with a first number of instances of gearwheel meshing, namely with two instances of gearwheel meshing, or winding-path gears with a larger, second number of instances of gearwheel meshing, namely with four instances of gearwheel meshing, can be made available, wherein the winding-path gears with the four instances of gearwheel meshing are the gears, in which either the shift element A or the shift element C is engaged.

Figure 2:
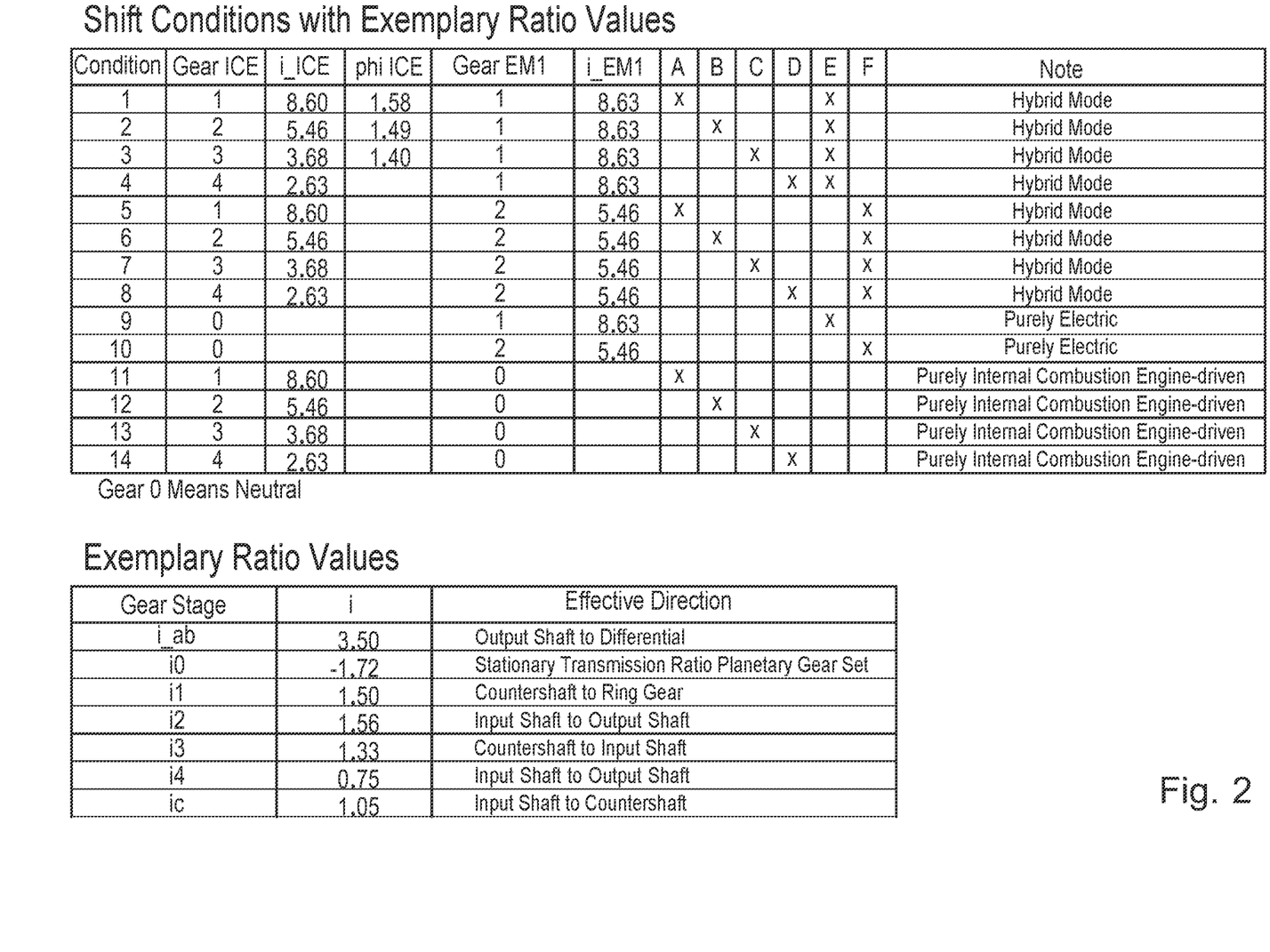
FIG. 2 shows a shift pattern of the transmission system from FIG. 1.

The shift pattern from FIG. 2 shows that the gears Gear VM1 and Gear VM2 are these types of winding-path gears. The gears Gear VM2 and Gear VM4, however, are conventional gears with only two instances of gearwheel meshing.

The second sub-transmission 6 for the second prime mover 4, which is preferably designed as an electric machine 4, is a planetary transmission, which includes a ring gear 22, a carrier 23, and a sun gear 24.

The ring gear 22 of the planetary transmission provides the second input shaft 8 of the transmission 2, namely of the second sub-transmission 6 thereof. In FIG. 1, the electric machine, which provides the second prime mover 4, is directly and/or immediately coupled to the second input shaft 8 and positioned coaxially to the planetary gear set, and so the planetary gear set is arranged nested in the rotor of the electric machine 4.

The output side of the planetary transmission 6 is formed by the carrier 23, which is permanently coupled, on the one hand, to the output shaft 9 and, on the other hand, to a gearwheel of the countershaft 11.

FIG. 1 shows that the carrier 23 of the planetary transmission and/or of the second sub-transmission 6 is fixedly coupled to the idler gear 14 and, via the idler gear 14, fixedly and/or permanently coupled to the output shaft 9, namely to the fixed gear 21 thereof.

Moreover, the carrier 23 according to FIG. 1 is permanently engaged with the gearwheel 18 of the counter shaft 11 via the gearwheel 15, which is designed as an idler gear of the first input shaft 7, as is also the case with the gearwheel 14, and is permanently coupled to the gearwheel 14. The gearwheel 18 of the countershaft 11 is an idler gear of the countershaft 11.

Both idler gears 17, 18 of the countershaft 11, which, depending on the shift position of the shift elements C and A, are coupleable to the countershaft 11 in a rotationally fixed manner, are thus operatively connected to the output shaft 9 via the idler gears 13, 14 of the first input shaft 7, which, depending on the shift position of the shift elements D and B, are coupleable to the first input shaft 7 in a rotationally fixed manner. The gearwheels 16, 17, 18 of the countershaft 11 mesh exclusively into the gearwheels positioned coaxially to the first input shaft 7, however, and not into gearwheels of the output shaft 9.

Shift elements E and F are associated with the second sub-transmission 6. Depending on the shift position of the shift elements E and F, the sun gear 24 of the planetary transmission is either fixedly connected to a housing 25 or connected to another element of the planetary transmission. When the shift element E is engaged, the sun gear 24 is fixedly connected to the housing 25. When the shift element F is engaged, in FIG. 1, the sun gear 24 is connected to the ring gear 22 of the planetary transmission, wherein the planetary transmission is then in direct drive.

The transmission 2 can be utilized for a purely electric operation, a purely internal combustion engine-driven operation, and a hybrid operation. The shift pattern from FIG. 2 summarizes, with the conditions 1 through 14, the particular possible operations, gears, and exemplary gear stages of the transmission in the particular gears. Shift elements that are engaged in the particular gear and/or condition of the transmission 2 are marked with an X in the shift pattern from FIG. 2. The ratio values of the shift pattern from FIG. 2 are merely examples.

Figure 3:
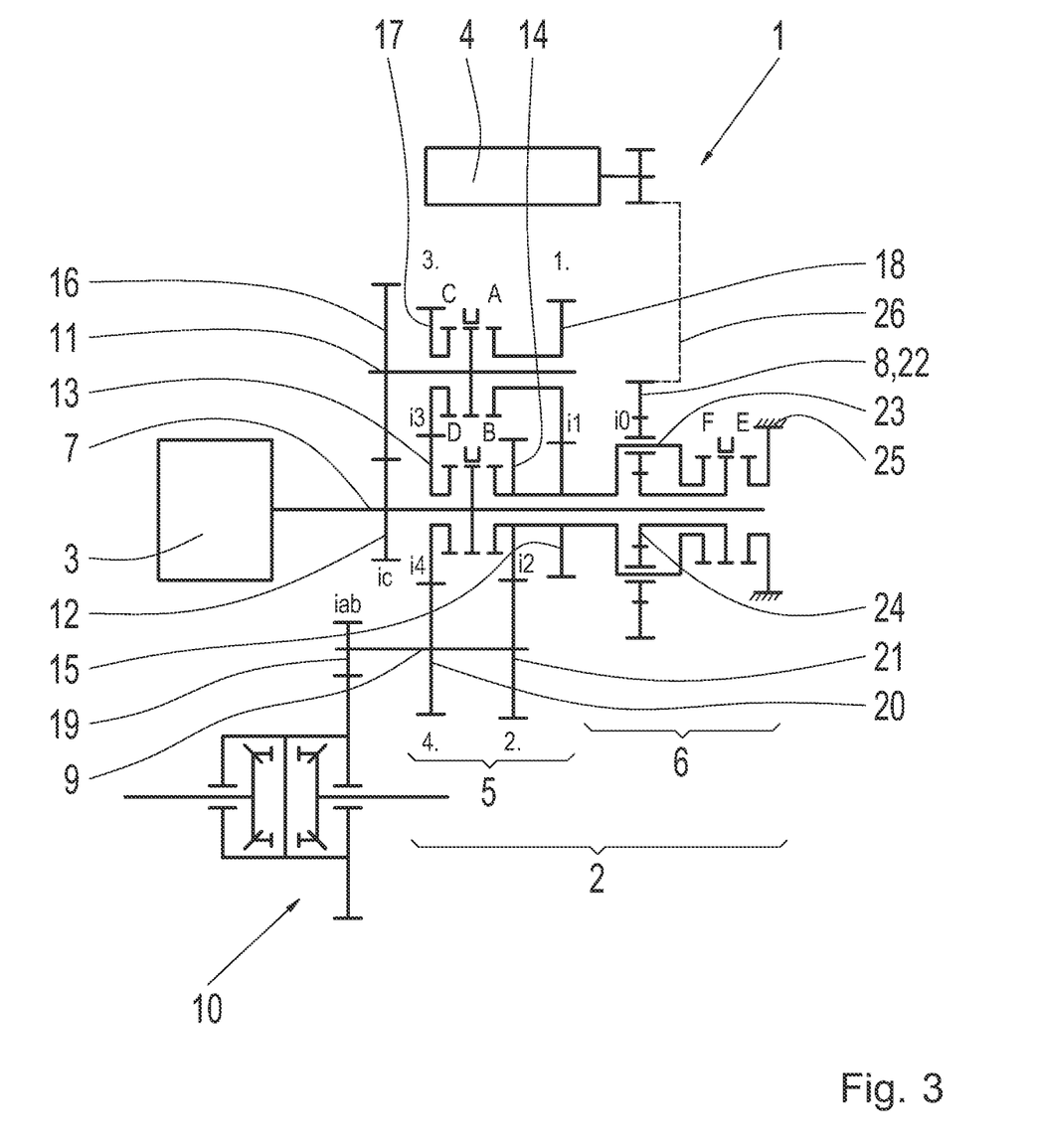
FIG. 3 shows a diagram of a transmission system of a motor vehicle with a second exemplary embodiment of a transmission.

FIG. 3 shows a modification of the exemplary embodiment from FIG. 1, in which the second prime mover 4, designed as an electric machine, is not arranged coaxially, but rather axially parallel. According to FIG. 3, the second prime mover 4, designed as an electric machine, is connected to the ring gear 22 of the planetary transmission and, thereby, to the second input shaft 8 of the transmission 2 via at least one spur gear stage 26 or, alternatively, via a chain, and, thus, is not directly, but rather indirectly operatively connected thereto. In FIG. 3, a further planetary gear set, as a pre-ratio, can also be connected between the planetary transmission and the electric machine 4.

A further difference of the exemplary embodiment from FIG. 3 as compared to the exemplary embodiment from FIG. 1 is that, in FIG. 3, when the shift element F is engaged, the sun gear 24 of the planetary transmission is not connected to the ring gear 22, but rather to the carrier 23. The planetary transmission is then interlocked in this case as well.

In the two exemplary embodiments from FIGS. 1 and 3, an additional starter-generator can be present, which is fixedly connected to the first prime mover 3, which is designed as an internal combustion engine, since charging via the second prime mover 4, which is designed as an electric machine, is not possible at a standstill.

It is pointed out that, in the exemplary embodiments from FIGS. 1 and 3 and in the exemplary embodiment from FIG.

Figure 5:
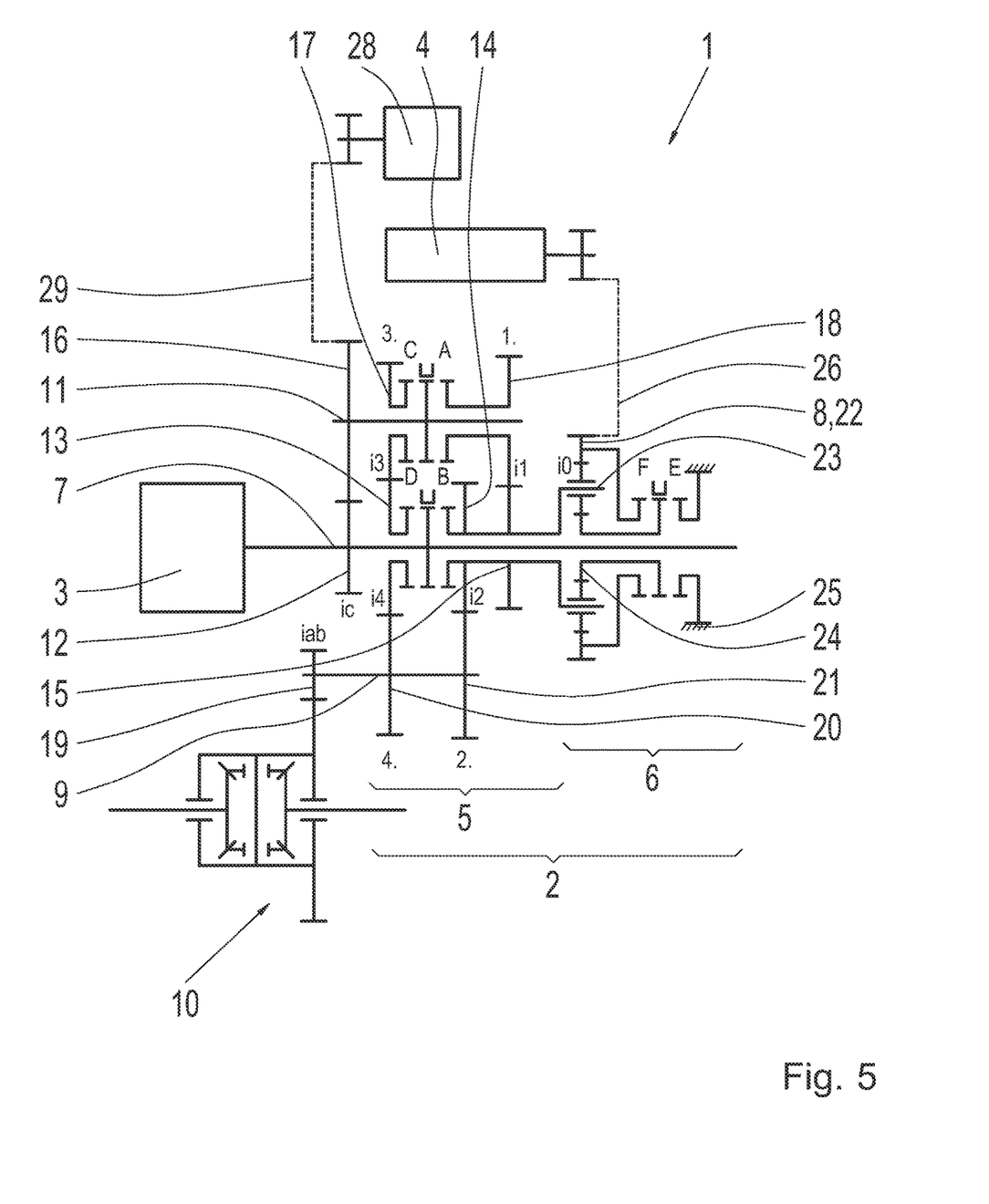
FIG. 5 shows a diagram of a transmission system of a motor vehicle with a fourth exemplary embodiment of a transmission.

5, the first input shaft 7 can also be designed shortened and then, starting from the internal combustion engine 3, extends only up to the double shift element of the shift elements D and B.

Figure 4:
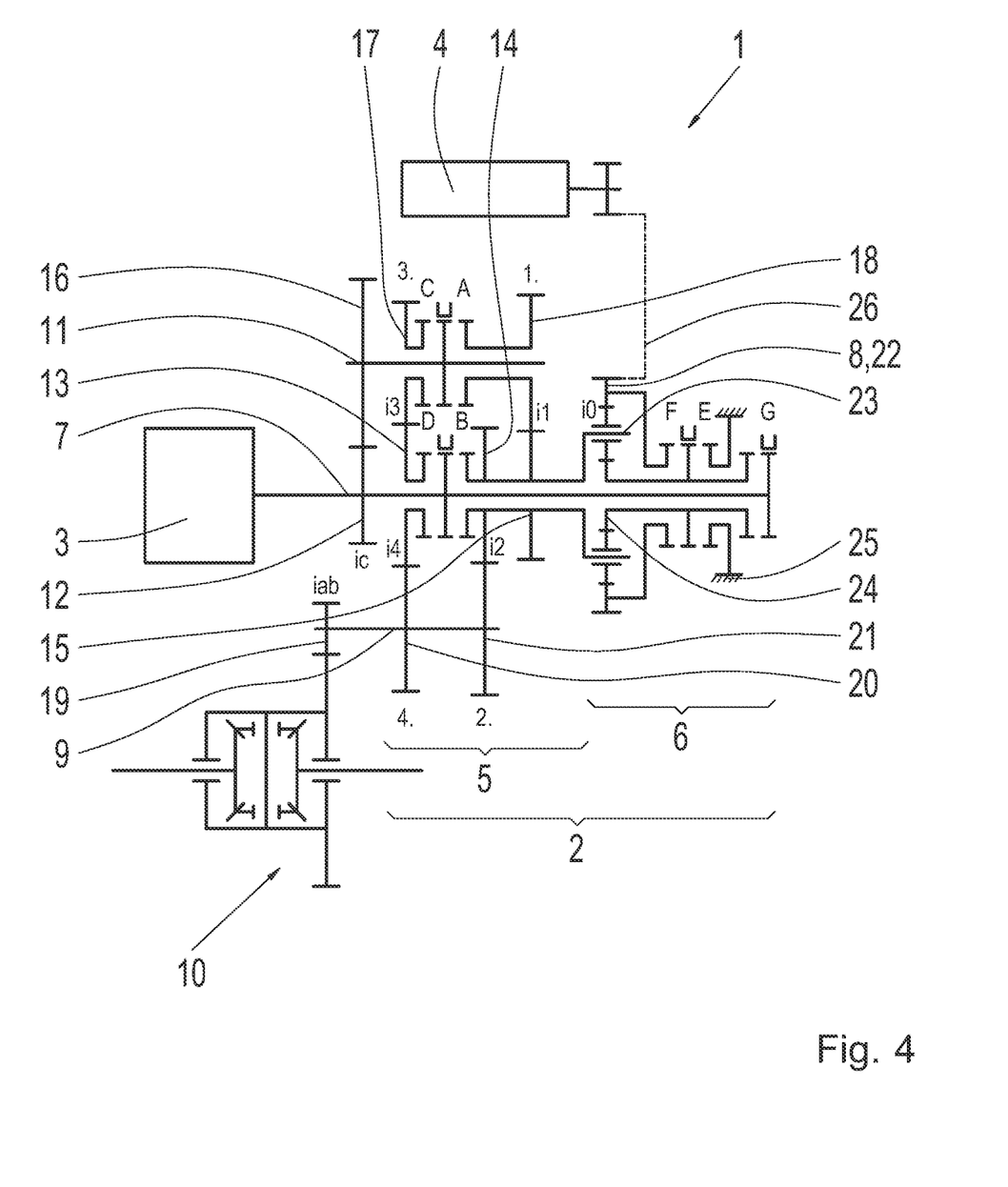
FIG. 4 shows a diagram of a transmission system of a motor vehicle with a third exemplary embodiment of a transmission.

FIG. 4 shows one further exemplary embodiment. The exemplary embodiment from FIG. 4 is based on the exemplary embodiment from FIG. 3, wherein the exemplary embodiment from FIG. 4 differs from the exemplary embodiment from FIG. 3 in that a further shift element G is associated with the second sub-transmission 6 of the transmission 2 in order to provide an EDA functionality.

For the case in which only the shift element G is engaged and all other shift elements A, B, C, D, E, and F are disengaged, a speed superimposition mode exists between the first prime mover 3, designed as an internal combustion engine, and the second prime mover 4, designed as an electric machine, at the planetary transmission 6, wherein the first prime mover 3, designed as an internal combustion engine, is then coupled to the sun gear 24 and the second prime mover 4, designed as an electric machine, acts upon the second transmission input shaft 8 and/or the ring gear 22 of the planetary transmission 6. The carrier 23 acts as a drive output and acts upon the output shaft 9. In the numerical example from FIG. 2, the torque ratio of the internal combustion engine 3 with respect to the differential is then 14.9 and is higher than the ratio of the first gear. The EDA operating mode therefore operates in a manner that expands the overall gear ratio.

In the EDA operating mode, a starting operation is possible when the electrical energy accumulator is dead, since the first prime mover 4, which is designed as an electric machine, then operates as a generator when the vehicle is stationary.

The exemplary embodiment from FIG. 5 is also based on the exemplary embodiment from FIG. 3 and includes a third prime mover 28, which is designed as an electric machine, as is also the case with the second prime mover 4. In FIG. 5, the third prime mover 28 is connected via at least one spur gear stage 29 to the countershaft 11, i.e., to the first sub-transmission 5, and, in fact, to the fixed gear 16 of the countershaft 11. Since the countershaft 11 is in a fixed speed ratio with the first input shaft 7 via the constant gear stage ic, the connection of the third prime mover 28, which is designed as an electric machine, to the fixed gear 16 of the countershaft 11 is advantageously possible. It is also possible to provide a further planetary gear set, as a pre-ratio, at the rotor of the electric machine 28. Moreover, the third prime mover 28, which is designed as an electric machine, can be directly connected to the fixed gear 12 of the first input shaft 7. The connection can also take place via a chain, for the purpose of which, however, an additional fixed gear would be necessary on the first input shaft 7 or the countershaft 11, which can be wrapped around by the chain.

The third prime mover 28, designed as an electric machine, can also be arranged coaxially at the first input shaft 7. Likewise, in FIG. 4, both prime movers 4 and 28, which are formed by electric machines, can each be positioned coaxially to the first input shaft 7.

The installation space-related advantages of the freely positionable countershaft 11, the gearwheels 16, 17, and 18 of which mesh exclusively with gearwheels 12, 13, and 15 positioned coaxially to the first input shaft 7, become even more significant in the case of prime movers 4 and 28 arranged axially in parallel, as shown in FIG. 5, since, in the case of axially parallel electric machines 4, 28, more parts must be located at the transmission periphery than is the case with coaxial electric machines.

The third prime mover 28, designed as an electric machine, of the exemplary embodiment from FIG. 5 can operate as a starter-generator and improve the function of the transmission system.

A serial operation is also possible in the exemplary embodiment from FIG. 5. In the serial operation, the third prime mover 28, which is designed as an electric machine, generates electric current for the second prime mover 4, which is also designed as an electric machine, and, in fact, in the shift conditions 9 and 10 of the shift pattern from FIG. 2.

Figure 6:
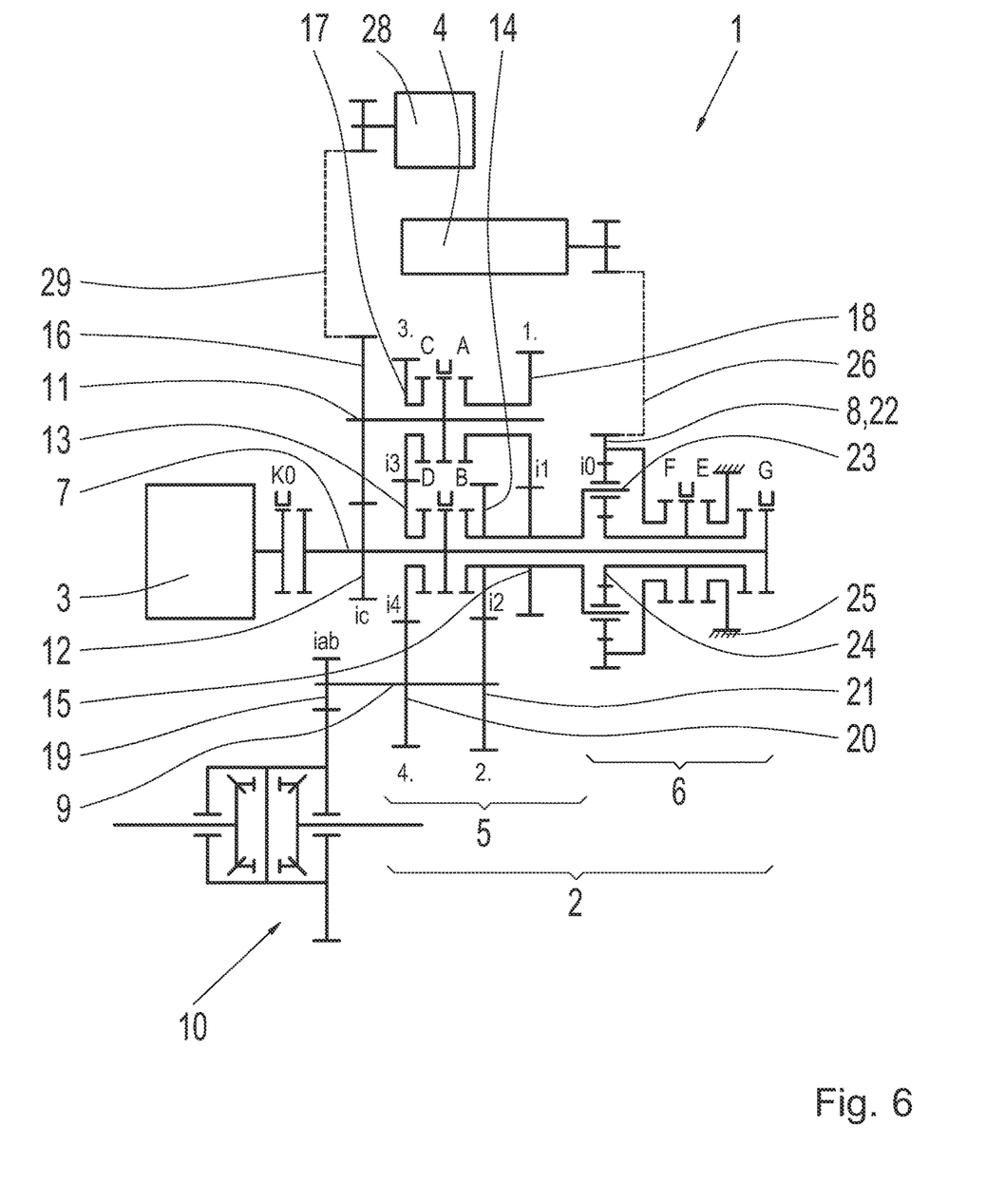
FIG. 6 shows a diagram of a transmission system of a motor vehicle with a fifth exemplary embodiment of a transmission.

FIG. 6 shows a further exemplary embodiment. In the exemplary embodiment from FIG. 6, the exemplary embodiments from FIGS. 4 and 5 are combined, i.e., the embodiment shown in FIG. 6 includes the additional shift element G and the third prime mover 28. Moreover, a separating clutch K0 is present in FIG. 6, which is connected between the first prime mover 3, designed as an internal combustion engine, and the first input shaft 7. In FIG. 6, the separating clutch K0 is designed as a form-locking dog clutch. For the case in which the separating clutch K0 is disengaged, the internal combustion engine 3 is decoupled from the first input shaft 7. When the separating clutch K0 is engaged, however, the internal combustion engine 3 is coupled to the first input shaft 7.

For the case in which the separating clutch K0 is engaged or, alternatively, not present, a power-split operation is possible, and, in fact, by utilizing the EDA operating mode, in which, in addition to the separating clutch K0, only the further shift element G is engaged and all other shift elements A, B, C, D, E, and F are disengaged. The three prime movers 3, 4, and 28 then cooperate. This power-split operation can be utilized for the starting operation when the electrical energy accumulator is dead, and also up to higher speeds. A changeover into all internal combustion engine-driven gears is possible for the case in which one of the shift elements A, B, C, and D is engaged.

In the exemplary embodiment from FIG. 6, travel can take place purely electrically when the separating clutch K0 is disengaged. In this case, the third prime mover 28 then replaces the first prime mover 3, wherein the third prime mover 28, which is designed as an electric machine, can then utilize the gears that the first sub-transmission 5 per se can utilize for the first prime mover 3, which is designed as an internal combustion engine. The shift conditions provided with the remark "hybrid drive" in the shift pattern from FIG. 2 then mean, in FIG. 6, an operation with both electric machines of the prime movers 4 and 28 when the separating clutch K0 is disengaged. The information for the internal combustion engine from FIG. 2 then applies for the electric machine of the prime mover 28.

In the exemplary embodiment from FIG. 6, a purely electric electronic speed sensor powershift can be implemented when the separating clutch K0 is disengaged. In this way, starting from the shift condition 9 from FIG. 2, in which the first electric gear is selected for the electric machine 4, a changeover can be implemented, without interruption of tractive force, into the shift condition 10, in which the second electric gear is then selected for the electric machine 4. For this purpose, the electric machine 28 is coupled to the sun gear 24 of the planetary transmission of the second sub-transmission 6 via the shift element G and takes over the supporting torque of the shift element E. The shift element E is subsequently disengaged. Subsequently, the shift element F is synchronized and engaged.

In this case, it is advantageous that the electric machine 28 needs less supporting torque and power at the sun gear 24 than the electric machine 4 at the ring gear 22, as the result of which the electric machine 28 can be designed to be small and low-cost.

Moreover, in the exemplary embodiment from FIG. 6, a purely electric starting operation is possible in the EDA operating mode when the separating clutch K0 is disengaged. In this case, only the further shift element G is engaged. All other shift elements A, B, C, D, E, and F are disengaged. A speed superimposition mode then exists for the two electric machines of the prime movers 4, 28 at the planetary transmission of the second sub-transmission 6. Thus, a starting operation can take place purely electrically, wherein both electric machines 4, 28 can rotate when the vehicle is stationary. A standstill derating can be prevented at the electric machines 4, 28.

It is possible to actuate the separating clutch K0 and the further shift element G via a common actuator, and so only one of the shift elements K0 or G can ever be engaged at a time, but never both simultaneously. As a result, an actuator can be saved. It is disadvantageous in this case, however, that a power-split operation is not possible when the separating clutch K0 is engaged, since the separating clutch K0 and the shift element G can not be simultaneously engaged. A serial operation is possible when the electrical energy accumulator is dead, however.

Figure 7:
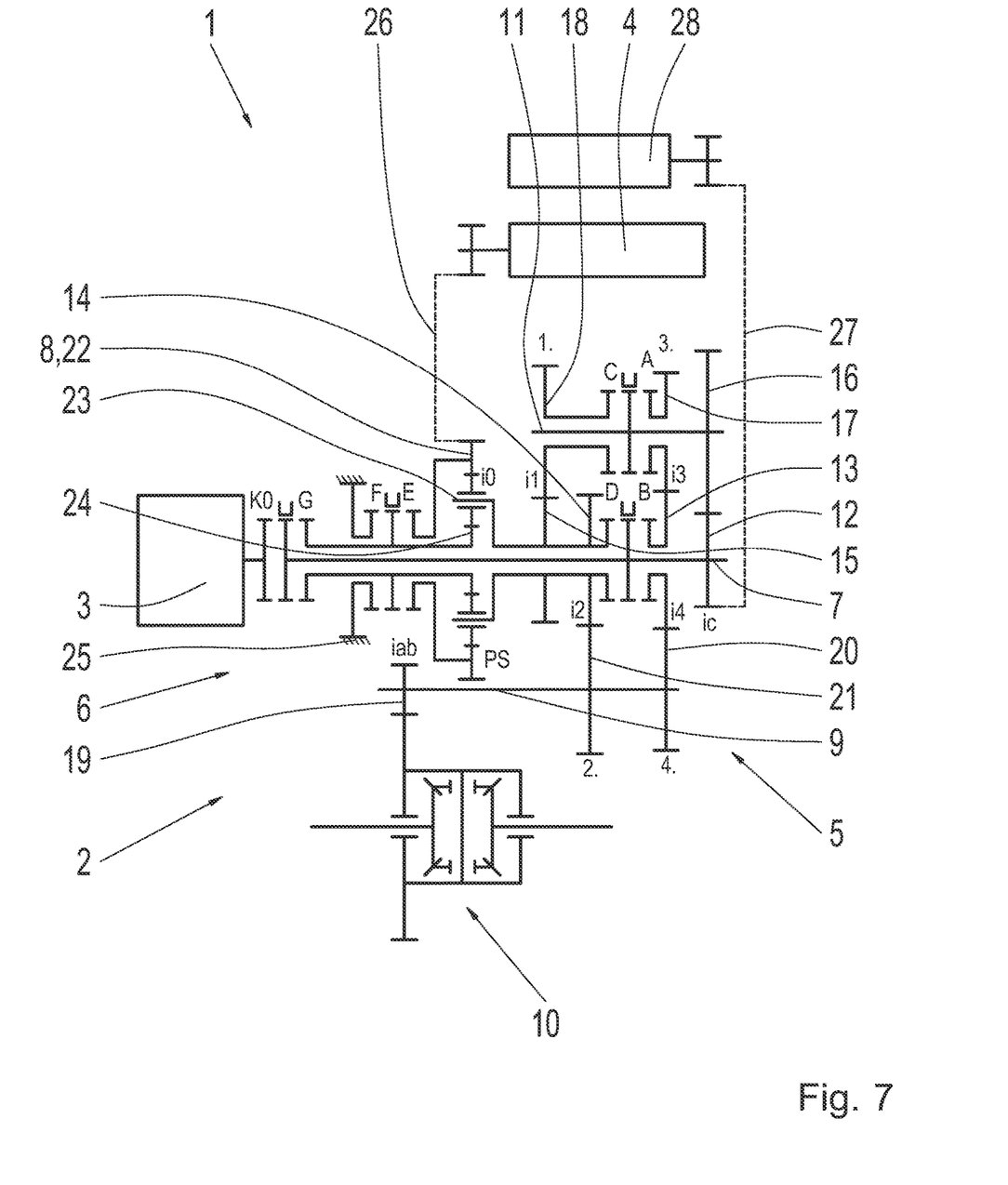
FIG. 7 shows a diagram of a transmission system of a motor vehicle with a sixth exemplary embodiment of a transmission.

FIG. 7 shows a modification of the exemplary embodiment from FIG. 6, in which the transmission is designed as a mirror image and/or the first prime mover 3, designed as an internal combustion engine, is connected at another side of the transmission 2, namely adjacent to the second sub-transmission 6. The two shift elements K0 and G, i.e., the separating clutch K0 and the further shift element G, can then be made available by a double shift element, which are then actuated via a common actuator in such a way that only one of the shift elements K0 and G is ever engaged at a time, but never both simultaneously. As mentioned above, a power-split operation is not possible when the separating clutch K0 is engaged, although a serial operation is possible when the electrical energy accumulator is dead.

A further difference between the exemplary embodiment from FIG. 6 and the exemplary embodiment from FIG. 7 is that, in the exemplary embodiment from FIG. 7, the third prime mover 28, which is designed as an electric machine, is not coupled via a spur gear stage 27 to the fixed gear 16 of the countershaft 11, as in FIG. 6, but rather to the fixed gear 12 of the first input shaft 7.

Figure 8:
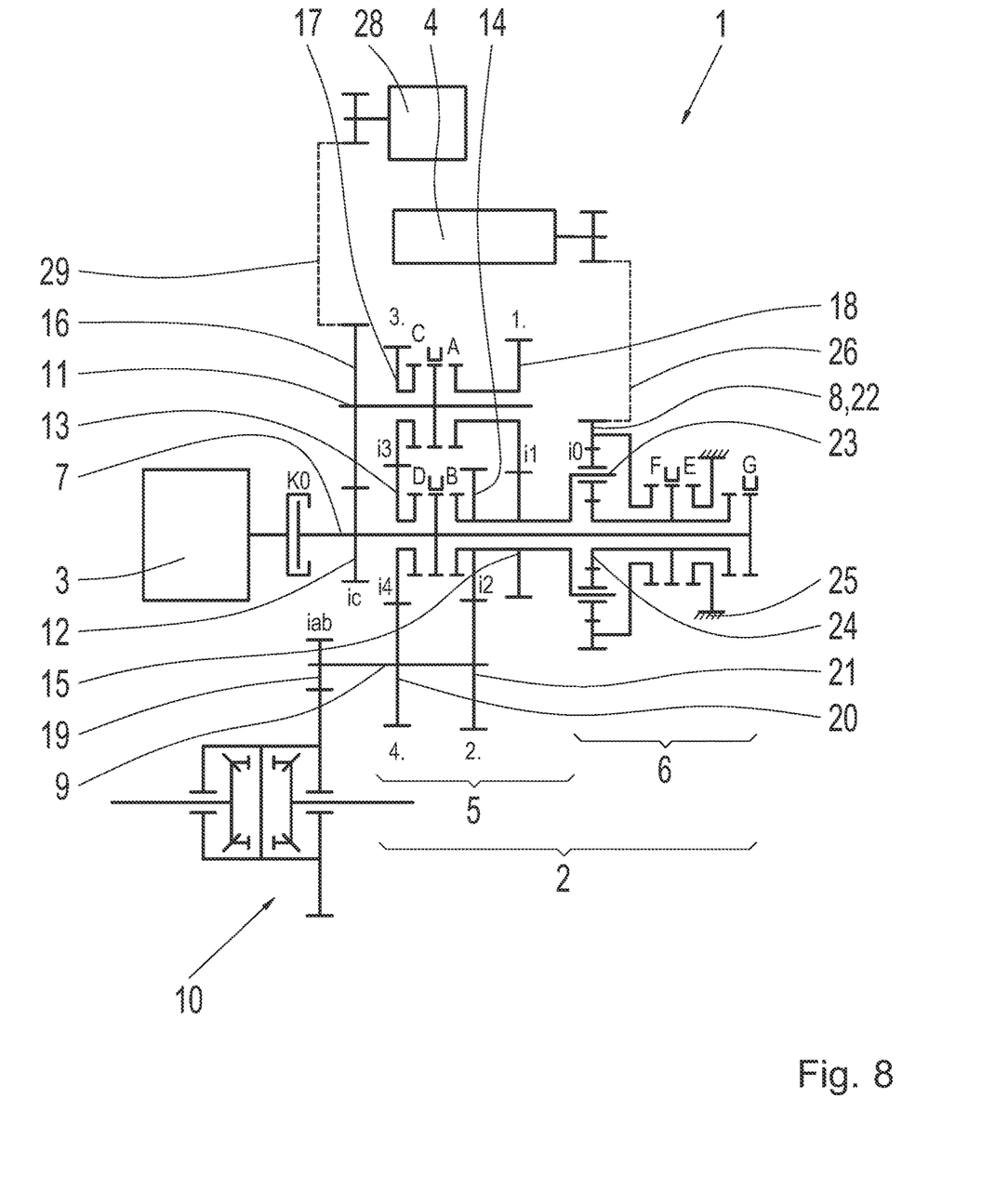
FIG. 8 shows a diagram of a transmission system of a motor vehicle with a further exemplary embodiment of a transmission.

FIG. 8 shows a further exemplary embodiment of the invention, wherein the exemplary embodiment from FIG. 8 differs from the exemplary embodiment from FIG. 6 only in that the separating clutch K0 is not designed as a form-locking dog clutch, but rather as a friction-locking clutch. It is advantageous in this case that the friction-locking separating clutch K0 can be disengaged under load, as the result of which stall protection can be made available for the first prime mover 3, which is designed as an internal combustion engine. During an emergency braking, the separating clutch K0 can be partially disengaged to a slipping condition, in order to prevent the internal combustion engine 3 from undesirably coming to a standstill.

In all exemplary embodiments shown, the electric machine of the first prime mover 4 can be arranged coaxially or axially parallel. Moreover, in all exemplary embodiments, the second electric machine of the third prime mover 28 can be present or not present, arranged coaxially or axially parallel, and connected in different ways to one of the fixed gears 16, 12 of the countershaft 11 or of the first input shaft 7. The transmission can be designed as a mirror image or not as a mirror image, wherein, in all exemplary embodiments, the further shift element G and/or the separating clutch K0 can be present, which can be designed either as a dog clutch or a friction clutch. The electric machines 4, 28 can preferably be integral assemblies of the transmission 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission system
2 transmission
3 first prime mover/internal combustion engine
4 second prime mover/electric machine
5 first sub-transmission
6 second sub-transmission
7 first input shaft
8 second input shaft
9 output shaft
10 drive output
11 countershaft
12 fixed gear
13 idler gear
14 idler gear
15 idler gear
16 fixed gear
17 idler gear
18 idler gear
19 fixed gear
20 fixed gear
21 fixed gear
22 ring gear
23 carrier
24 sun gear
25 housing
26 spur gear stage
27 spur gear stage
28 third prime mover/electric machine
29 spur gear stage
A shift element
B shift element
C shift element
D shift element
E shift element
F shift element
G shift element
K0 separating clutch

The invention claimed is:

1. A transmission (2) of a motor vehicle, comprising:
a first input shaft (7) for a first prime mover (3);
a second input shaft (8) for a second prime mover (4);
an output shaft (9);
a first sub-transmission (5) for the first prime mover (3), the first sub-transmission (5) comprising the first input shaft (7) and a countershaft (11) coupled to the first input shaft (7) with a constant ratio;

a plurality of gearwheels (16, 17, 18) arranged on the countershaft (11), the plurality of gearwheels (16, 17, 18) meshed exclusively with a plurality of gearwheels (12, 13, 15) arranged coaxially to the first input shaft (7), one or more of the plurality of gearwheels (14, 15) arranged coaxially to the first input shaft (7) meshing with a plurality of gearwheels (20, 21) arranged on the output shaft (9);

a plurality of shift elements (A, B, C, D) associated with the first input shaft (7) and the countershaft (11), the plurality of shift elements (A, B, C, D) associated with the first input shaft (7) and the countershaft (11), depending on shift position, providing either a gear with a first number of instances of gearwheel meshing or a winding-path gear with a second, larger number of instances of gearwheel meshing for the first prime mover (3);

a second sub-transmission (6) for the second prime mover (4), the second sub-transmission (6) comprising the second input shaft (8), the second sub-transmission (6) configured as a planetary transmission with a sun gear (24), a ring gear (22), and a carrier (23), the ring gear (22) forming the second input shaft (8) of the second sub-transmission (6), the carrier (23) permanently coupled to the output shaft (9) and to a gearwheel (18) arranged on the countershaft (11); and a plurality of shift elements (F, E) associated with the planetary transmission and configured to selectively, depending on their shift position, fix the sun gear (24) to a housing or bring the planetary transmission into direct drive.

2. The transmission of claim 1, wherein:

the carrier (23) of the planetary transmission is permanently coupled to the output shaft (9) via a gearwheel (14) arranged coaxially to the first input shaft (7); and the carrier (23) of the planetary transmission is permanently coupled to the gearwheel (18) arranged on the countershaft (11) via a further gearwheel (15) arranged coaxially to the first input shaft (7).

3. The transmission of claim 2, wherein the gearwheel (14) arranged coaxially to the first input shaft (7) and the gearwheel (14) arranged coaxially to the first input shaft (7) are idler gears of the first input shaft (7), which are connected to each other in a rotationally fixed manner.

4. The transmission of claim 1, wherein the gearwheel (18) arranged on the countershaft (11) is an idler gear of the countershaft (11), which is coupled to the countershaft (11) in a rotationally fixed manner when one of the shift elements (A) associated with the countershaft (11) is engaged.

5. The transmission of claim 1, wherein the second prime mover (4) is directly coupleable to the second input shaft (8) of the second sub-transmission (6) such that the second prime mover (4) is directly operatively connected to the second input shaft (8) of the second sub-transmission (6).

6. The transmission of claim 1, wherein the second prime mover (4) is indirectly coupleable to the second input shaft (8) of the second sub-transmission (6) such that the second prime mover (4) is indirectly operatively connected to the second input shaft (8) of the second sub-transmission (6).

7. The transmission of claim 1, further comprising an additional shift element (G) associated with the planetary transmission, via which, depending on shift position, a speed superimposition mode is settable for the first prime mover (3) and the second prime mover (4) at the planetary transmission, wherein the first prime mover (3) coupled to the sun gear (24) of the planetary transmission, the second prime mover (4) is coupled to the ring gear (22) of the planetary transmission, and the carrier (23) of the planetary transmission is coupled to the output shaft (9) in the speed superimposition mode.

8. The transmission of claim 1, further comprising a third prime mover (28) configured as an electric machine, wherein the third prime mover (28) is operatively connected to the first input shaft (7).

9. The transmission of claim 1, wherein a fixed gear (12) arranged on the first input shaft meshes into a fixed gear (16) arranged on the countershaft in order to provide the constant ratio between the first input shaft (7) and the countershaft (11).

10. The transmission of claim 9, further comprising a third prime mover (28) configured as an electric machine, wherein the third prime mover (28) is coupled either to the fixed gear (12) arranged on the first input shaft (7) or to the fixed gear (16) arranged on the countershaft (11).

11. The transmission of claim 1, further comprising a separating clutch (K0) associated with the first input shaft (7) for the selectively connecting the first prime mover (3) to the first input shaft (7).

12. A transmission system of a motor vehicle, comprising:
the transmission (2) of claim 1;
a first prime mover (3) coupled to the first input shaft (7);
a second prime mover (4) coupled to the second input shaft (8); and
a drive output (10) coupled to the output shaft (9).

* * * * *